United States Patent
Qiu et al.

(10) Patent No.: US 11,778,711 B2
(45) Date of Patent: Oct. 3, 2023

(54) BRIGHTNESS CONTROL METHOD OF ILLUMINATION DEVICE, BRIGHTNESS CONTROL DEVICE AND BRIGHTNESS CONTROL SYSTEM

(71) Applicant: Faurecia Clarion Electronics (Xiamen) Co., Ltd., Fujian (CN)

(72) Inventors: Jie Qiu, Fujian (CN); Chen Shen, Fujian (CN); Songhua Gan, Fujian (CN)

(73) Assignee: FAURECIA CLARION ELECTRONICS (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 17/713,637

(22) Filed: Apr. 5, 2022

(65) Prior Publication Data

US 2022/0330405 A1 Oct. 13, 2022

(30) Foreign Application Priority Data

Apr. 8, 2021 (CN) .......................... 202110378398.2

(51) Int. Cl.
*H05B 47/11* (2020.01)
*H05B 45/325* (2020.01)
*H05B 45/10* (2020.01)
*G06V 20/59* (2022.01)

(52) U.S. Cl.
CPC ............. *H05B 47/11* (2020.01); *H05B 45/10* (2020.01); *H05B 45/325* (2020.01); *G06V 20/597* (2022.01)

(58) Field of Classification Search
CPC ...... H05B 47/11; H05B 47/115; H05B 45/10; H05B 45/325
See application file for complete search history.

(56) References Cited

U.S. PATENT DOCUMENTS

| | | | |
|---|---|---|---|
| 2011/0279041 A1* | 11/2011 | Dai | G09G 3/3406 315/158 |
| 2012/0039592 A1* | 2/2012 | Chou | G03B 7/08 396/164 |
| 2018/0270928 A1* | 9/2018 | Simonian | H05B 45/22 |
| 2020/0166823 A1* | 5/2020 | Peterson | G03B 15/02 |
| 2020/0282867 A1* | 9/2020 | Yi | G06N 3/02 |
| 2020/0375005 A1* | 11/2020 | Gu | F21K 9/62 |
| 2021/0157995 A1* | 5/2021 | Chang | G06K 7/10722 |
| 2022/0334424 A1* | 10/2022 | Chen | G02F 1/13396 |

FOREIGN PATENT DOCUMENTS

| | | |
|---|---|---|
| CN | 101917795 A | 12/2010 |
| CN | 107244306 A | 10/2017 |
| CN | 104850108 B | 12/2017 |

* cited by examiner

*Primary Examiner* — Raymond R Chai
(74) *Attorney, Agent, or Firm* — Morgan, Lewis & Bockius LLP

(57) ABSTRACT

A brightness control method of an illumination device includes: obtaining a brightness of ambient light, determining an amount of supplementary light according to the brightness of the ambient light and target brightness if the brightness of the ambient light is less than the target brightness, and generating a first pulse signal according to the amount of supplementary light to control the illumination device to emit light.

14 Claims, 8 Drawing Sheets

US 11,778,711 B2

BRIGHTNESS CONTROL METHOD OF ILLUMINATION DEVICE, BRIGHTNESS CONTROL DEVICE AND BRIGHTNESS CONTROL SYSTEM

CROSS-REFERENCE TO RELATED APPLICATION

This application claims priority to Chinese Patent Application No. 202110378398.2, filed on Apr. 8, 2021, which is incorporated herein by reference in its entirety.

TECHNICAL FIELD

The present disclosure relates to the field of electronic technologies, and in particular, to a brightness control method of an illumination device, a brightness control device and a brightness control system.

BACKGROUND

An advanced driving assistance system (ADAS) includes a driver monitoring system (DMS). In the DMS, in order to improve a display effect of a captured image, the DMS usually includes an illumination device for supplementing light. The brightness of the illumination device is usually adjusted according to the actual scenario.

SUMMARY

In an aspect, a brightness control method of an illumination device is provided. The brightness control method includes: obtaining a brightness of ambient light, determining an amount of supplementary light according to the brightness of the ambient light and a target brightness if the brightness of the ambient light is less than the target brightness, and generating a first pulse signal according to the amount of supplementary light to control the illumination device to emit light.

In some embodiments, after generating the first pulse signal according to the amount of supplementary light, the brightness control method further includes sending the first pulse signal to a driver device, so that the driver device controls, according to the first pulse signal, the illumination device to emit light.

In some embodiments, the brightness control method further includes sending a second pulse signal to the driver device to control the driver device to be turned on or off.

In some embodiments, sending the first pulse signal to the driver device, so that the driver device controls, according to the first pulse signal, the illumination device to emit light, includes: sending the first pulse signal to an integrating circuit, so that the integrating circuit outputs a current or a voltage to the driver device to drive the driver device to output a drive current to the illumination device.

In some embodiments, generating the first pulse signal according to the amount of supplementary light includes: obtaining a driving signal according to the amount of supplementary light, obtaining a duty cycle of the first pulse signal according to the driving signal and a correspondence between the driving signal and the duty cycle of the first pulse signal, and generating the first pulse signal according to the duty cycle of the first pulse signal.

In some embodiments, obtaining the driving signal according to the amount of supplementary light includes: obtaining, according to a following formula, a power converted into light in an output power of the illumination device when the illumination device is driven to emit light with the amount of supplementary light:

$$POY_n = \frac{(POY_2 - POY_1)}{(W_2 - W_1) \cdot W_n};$$

where $POY_2$ is a power, converted into light with a maximum brightness, in an output power of the illumination device when the illumination device is driven to emit the light with the maximum brightness, $POY_1$ is a power, converted into light with a minimum brightness in another output power of the illumination device when the illumination device is driven to emit the light with the minimum brightness, $POY_n$ is a power, converted into light with the amount of supplementary light, in yet another output power of the illumination device when the illumination device is driven to emit the light with the amount of supplementary light, n represents the driving signal corresponding to the amount of supplementary light; $W_2$ is the maximum brightness, $W_1$ is the minimum brightness, and $W_n$ is the amount of supplementary light; and obtaining the driving signal according to the power converted into the light with the amount of supplementary light, and a correspondence between the driving signal and the power converted into the light with the amount of supplementary light.

In another aspect, a brightness control device of an illumination device is provided. The brightness control device includes a memory and one or more processor coupled to the memory. The memory is configured to store computer program codes including computer program instructions. At least one processor is configured to when executing the computer program instructions, perform: obtaining a brightness of ambient light, determining an amount of supplementary light according to the brightness of the ambient light and a target brightness if the brightness of the ambient light is less than the target brightness, and generating a first pulse signal according to the amount of supplementary light to control the illumination device to emit light.

In some embodiments, the at least one processor is further configured to perform: sending the first pulse signal to a driver device, so that the driver device controls, according to the first pulse signal, the illumination device to emit light.

In some embodiments, the at least one processor is further configured to perform: sending a second pulse signal to the driver device to control the driver device to be turned on or off.

In some embodiments, the at least one processor is configured to perform: sending the first pulse signal to an integrating circuit, so that the integrating circuit outputs a current or a voltage to the driver device to drive the driver device to output a drive current to the illumination device.

In some embodiments, the at least one processor is configured to perform: obtaining a driving signal according to the amount of supplementary light, obtaining a duty cycle of the first pulse signal according to the driving signal and a correspondence between the driving signal and the duty cycle of the first pulse signal, and generating the first pulse signal according to the duty cycle of the first pulse signal.

In some embodiments, the at least one processor is configured to perform: obtaining, according to a following formula, a power converted into light in an output power of the illumination device when the illumination device is driven to emit light with the amount of supplementary light:

$$POY_n = \frac{(POY_2 - POY_1)}{(W_2 - W_1) \cdot W_n};$$

where $POY_2$ is a power, converted into light with a maximum brightness, in an output power of the illumination device when the illumination device is driven to emit the light with the maximum brightness, $POY_1$ is a power, converted into light with a minimum brightness, in another output power of the illumination device when the illumination device is driven to emit the light with the minimum brightness, $POY_n$ is a power, converted into light with the amount of supplementary light, in yet another output power of the illumination device when the illumination device is driven to emit the light with the amount of supplementary light, n represents the driving signal corresponding to the amount of supplementary light; $W_2$ is the maximum brightness, $W_1$ is the minimum brightness, and $W_n$ is the amount of supplementary light; and obtaining the driving signal according to the power converted into the light with the amount of supplementary light, and a correspondence between the driving signal and the power converted into the light with the amount of supplementary light.

In yet another aspect, a non-transitory computer-readable storage medium is provided. The computer-readable storage medium includes computer program instructions that, when run on a computer, cause the computer to perform the brightness control method as described above.

In yet another aspect, a computer program product is provided. The computer program product includes computer program instructions stored in a non-transitory computer-readable storage medium that, when run on a computer, cause the computer to perform the brightness control method as described above.

In yet another aspect, a brightness control system of an illumination device is provided. The brightness control system includes an ambient light detection device and a control device. The ambient light detection device is configured to detect a brightness of ambient light. The control device is coupled to the ambient light detection device and is configured to obtain the brightness of ambient light from the ambient light detection device, determine an amount of supplementary light according to the brightness of the ambient light and a target brightness if the brightness of the ambient light is less than the target brightness, and generate a first pulse signal according to the amount of supplementary light to control the illumination device to emit light.

In some embodiments, the brightness control system further includes a driver device coupled to the control device. The control device is further configured to send the first pulse signal to the driver device. The driver device is configured to control, according to the first pulse signal, the illumination device to emit light.

In some embodiments, the control device is further configured to send a second pulse signal to the driver device to control the driver device to be turned on or off.

In some embodiments, the brightness control system further includes an integrating circuit coupled to the driver device and the control device. The control device is further configured to send the first pulse signal to the integrating circuit. The integrating circuit is configured to outputs a current or a voltage to the driver device. The driver device is configured to output, as driven by the current or the voltage, a drive current to the illumination device.

In some embodiments, the control device is configured to: obtain a driving signal according to the amount of supplementary light, obtain a duty cycle of the first pulse signal according to the driving signal and a correspondence between the driving signal and the duty cycle of the first pulse signal, and generate the first pulse signal according to the duty cycle of the first pulse signal.

In some embodiments, the control device is configured to: obtain, according to a following formula, a power converted into light in an output power of the illumination device when the illumination device is driven to emit light with the amount of supplementary light:

$$POY_n = \frac{(POY_2 - POY_1)}{(W_2 - W_1) \cdot W_n};$$

where $POY_2$ is a power, converted into light with a maximum brightness, in an output power of the illumination device when the illumination device is driven to emit the light with the maximum brightness, $POY_1$ is a power, converted into light with a minimum brightness, in another output power of the illumination device when the illumination device is driven to emit the light with the minimum brightness, $POY_n$ is a power, converted into light with the amount of supplementary light, in yet another output power of the illumination device when the illumination device is driven to emit the light with the amount of supplementary light, n represents the driving signal corresponding to the amount of supplementary light; $W_2$ is the maximum brightness, $W_1$ is the minimum brightness, and $W_n$ is the amount of supplementary light; and obtain the driving signal according to the power converted into the light with the amount of supplementary light, and a correspondence between the driving signal and the power converted into the light with the amount of supplementary light.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on actual sizes of products, actual processes of methods and actual timings of signals to which the embodiments of the present disclosure relate.

DETAILED DESCRIPTION

Figure 1:
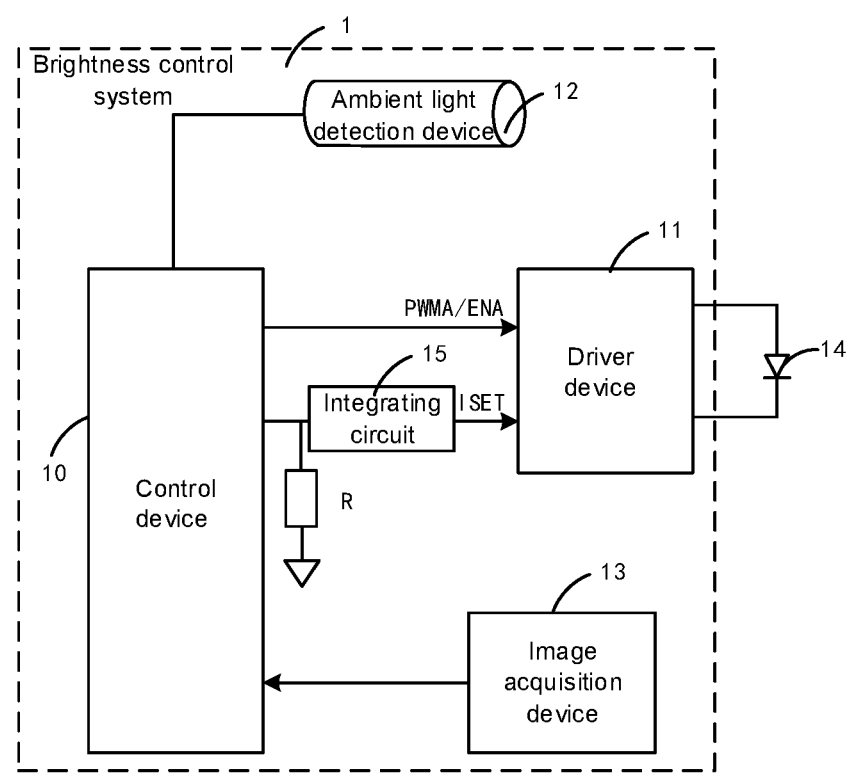
FIG. 1 is a block diagram of a brightness control system of an illumination device, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or examples(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined by "first" and "second" may explicitly or implicitly include one or more of the features. In the description of the embodiments of the present disclosure, the term "a plurality of/the plurality of" means two or more unless otherwise specified.

In the description of some embodiments, the terms "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B, and C" has a same meaning as the phrase "at least one of A, B, or C", and both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The use of "applicable to" or "configured to" indicates an open and inclusive meaning, which does not exclude apparatuses that are applicable to or configured to perform additional tasks or steps.

For convenience of understanding, an application scenario of the embodiments of the present disclosure will be described first.

A driver monitoring system (DMS) is mainly to monitor whether there is a dangerous operation done by a driver in a process of driving a vehicle. Contents monitored by the driver monitoring system may include fatigued driving, not looking ahead for a long time, smoking, making or answering phone calls, hands off the steering wheel, not wearing a seat belt, etc. When the driver monitoring system detects the dangerous behavior of the driver, it will generate an alarm.

For example, the driver monitoring system includes an image acquisition device and a control device. The image acquisition device captures an image of the behavior of the driver, and the control device recognizes the captured image to determine whether there is dangerous driving. In order to ensure a display effect of the captured image, the driver monitoring system may further include an illumination device to supplement light for a shot environment of the image acquisition device. The brightness of the illumination device is adjusted according to the actual scenario.

In some embodiments of the present disclosure, a brightness control system of the illumination device is provided for controlling, for example, a brightness of the illumination device. As shown in FIG. 1, the brightness control system 1 includes a control device 10, a driver device 11 and an ambient light detection device 12. The control device 10 is coupled to the driver device 11 and the ambient light detection device 12. The driver device 11 is coupled to the illumination device 14.

The illumination device 14 may be configured to emit light when a brightness of ambient light is low (e.g., lower than a target brightness), so as to supplement the ambient light. In this way, an image captured by the image acquisition device in the driver monitoring system may be clear and bright. For example, the illumination device 14 is an illumination lamp, such as a light-emitting diode (LED) lamp.

In some examples, the control device 10 and driver device 11 may be integrated into a single device or may be separate devices. For example, the driver device 11 is integrated into the control device 10. In this case, the control device 10 is directly coupled to the illumination device 14 to control the brightness of the illumination device 14.

Hereinafter, the description is made by considering an example where the control device 10 and the driver device 11 are separate devices. As for the case where the control device 10 and the driver device 11 are integrated into a single device, reference may be made to the description, which will not be repeated herein.

The ambient light detection device 12 is configured to detect the brightness of the ambient light and send the detected brightness of the ambient light to the control device 10. For example, the ambient light detection device 12 is a light sensor. The light sensor detects light energy of ultraviolet light to infrared light, converts the light energy into an electric signal, and transmits the electric signal into the control device 10.

The control device 10 is the core of the brightness control system 1. The control device 10 may be a system on chip (SoC).

The control device 10 is configured to: receive the brightness of the ambient light detected by the ambient light detection device 12; if the brightness of the ambient light is less than a target brightness, determine an amount of supplementary light according to the brightness of the ambient light and a target brightness; and generate a first pulse signal according to the amount of supplementary light, so as to control the illumination device 14 to emit light.

In some examples, the illumination device 14 is controlled by the driver device 11 to emit light. Therefore, after generating the first pulse signal, the control device 10 sends the first pulse signal to the driver device 11. In this case, the control device 10 is further configured to send the first pulse signal to the driver device 11, so that the driver device 11 controls, according to the first pulse signal, the illumination device 14 to emit light.

In order to reduce the power consumption of the brightness control system 1, in some examples, the driver device 11 is turned on when the illumination device 14 is to emit light, and turned off when the illumination device 14 does not emit light. For example, the driver device 11 is turned on as driven by a high-level/low-level signal. In this case, the control device 10 is further configured to send a second pulse signal to the driver device 11 to control the driver device 11 to be turned on or off, so as to control the illumination device 14 to emit light or not to emit light.

Both the first pulse signal and the second pulse signal may be pulse width modulation (PWM) signals.

In these examples, the driver device 11 may be configured to output a drive current according to the first pulse signal when the driver device 11 is turned on, so that the illumination device 14 emits light as driven by the drive current.

For example, when the second pulse signal sent by the control device 10 to the driver device 11 is a first level (e.g., a high level) signal, the driver device 11 is turned on and outputs the drive current according to the first pulse signal. In this case, the illumination device 14 may be driven by the drive current to emit light.

For another example, when the second pulse signal sent by the control device 10 to the driver device 11 is a second level (e.g., a low level) signal, the driver device 11 is turned off, so as to stop outputting the drive current. In this case, the illumination device 14 does not emit light because no drive current is flowing therein.

In some examples, the driver device 11 is a driver chip. In this case, in order to make the driver chip operate normally, that is, in order to make the driver chip be turned on and output the drive current, and further to control the illumination device 14 to emit light as driven by the drive current, the control device 10 provides corresponding control signals (e.g., the first pulse signal and the second pulse signal) to the driver chip.

For example, as shown in FIG. 1, the control device 10 provides control signals (e.g., the first pulse signal and the second pulse signal) to an EN pin, a PWMA pin, and an ISET pin of the driver chip. The EN pin and the PWMA pin of the driver chip are used for receiving the second pulse signal to control the driver chip to be turned on or off. The ISET pin of the driver chip is used for receiving the first pulse signal, so as to output the drive current to the illumination device 14 according to the first pulse signal. Generally, a magnitude of the drive current input to the illumination device 14 may be adjusted by adjusting a magnitude of the voltage or current at the ISET pin, thereby adjusting the light-emitting brightness of the illumination device 14.

It will be noted that the pins of the driver chip may be different in different applications limited by application scenarios and a purpose of miniaturization of the driver chip. For example, the EN pin and the PWMA pin are multiplexed, and there is no Fault pin. FIG. 1 shows an example where the EN pin and the PWMA pin are multiplexed.

In addition, since the first pulse signal is a pulse width modulation (PWM) signal, the ISET pin of the driver chip may be in a current detection mode or a voltage detection mode.

In this case, in some examples, the brightness control system 1 further includes an integrating circuit 15. The integrating circuit 15 is coupled to the control device 10 and the driver device 11. The control device 10 is configured to send the first pulse signal to the integrating circuit 15. The integrating circuit 15 is configured to convert the first pulse signal into a current or a voltage that may be detected by the ISET pin of the driver device 11, so that the driver device 11 outputs a drive current according to the current or the voltage that may be detected by the ISET pin for driving the illumination device 14 to emit light.

As shown in FIG. 1, if the ISET pin is in the voltage detection mode, the ISET pin is coupled to a fixed resistor R, and a drive current for driving the illumination device 14 to emit light may be obtained according to a relationship between a resistance of the fixed resistor R and the voltage output by the integrating circuit 15.

Figure 2:
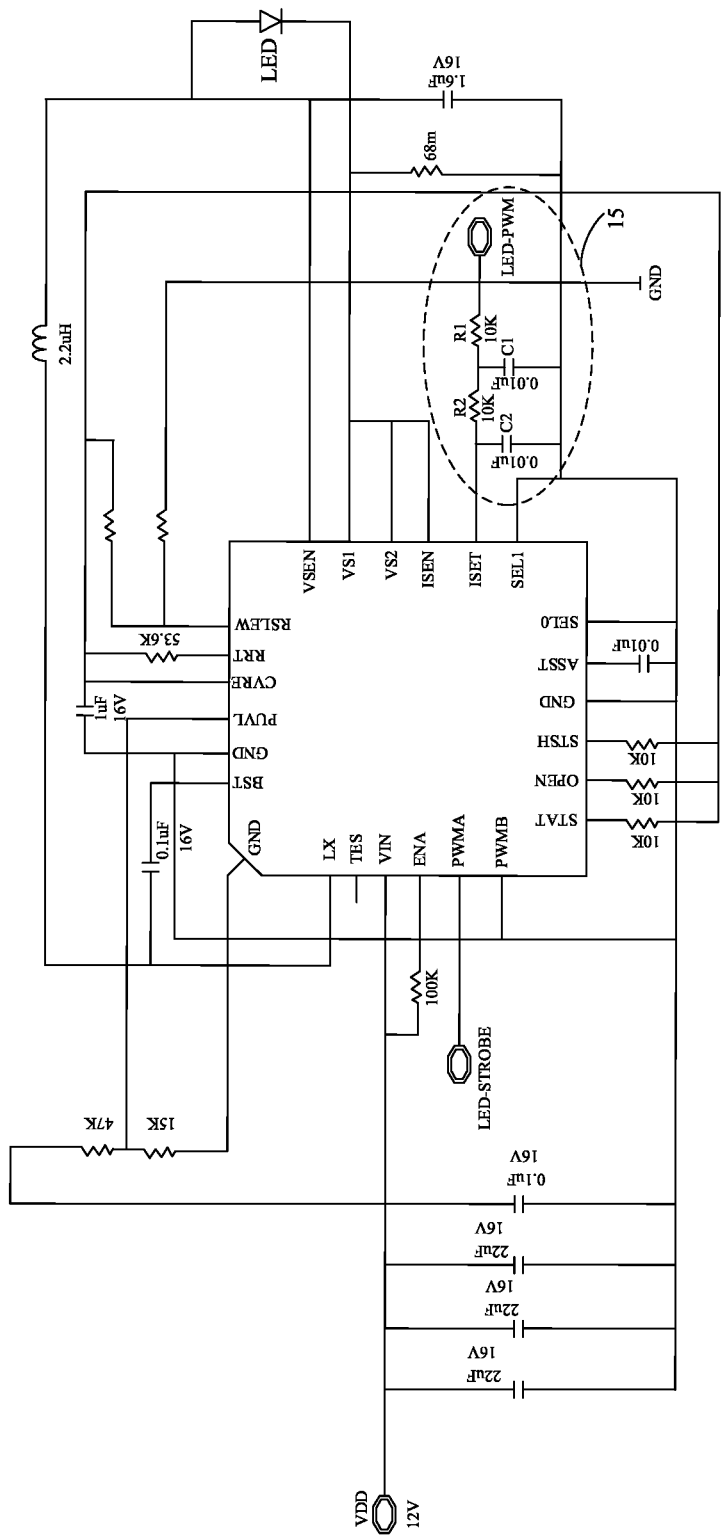
FIG. 2 is a circuit diagram of a driver device coupled to an integrating circuit, in accordance with some embodiments.

FIG. 2 is a circuit diagram of a driver chip coupled to an integrating circuit according to some embodiments, and the driver chip may be applied to the driver device 11 shown in FIG. 1.

As shown in FIG. 2, the PWMA pin of the driver chip is used to receive a second pulse signal (e.g., an LED-STROBE pulse signal in FIG. 2) sent by the control device 10, and the driver chip is turned on or off according to the second pulse signal. The ISET pin is used to receive a first pulse signal (e.g., an LED-PWM pulse signal in FIG. 2) sent by the control device 10.

For example, the first pulse signal sent by the control device 10 may be input to the ISET pin of the driver chip through the integrating circuit 15. After the first pulse signal is input to the integrating circuit 15, the integrating circuit 15 may output a current or a voltage. Therefore, the ISET pin of the driver chip may detect the current or the voltage, so that the driver chip outputs a drive current according to the current or the voltage to drive the illumination device 14 to emit light.

In addition, the driver chip shown in FIG. 2 may be OZ585. For descriptions of functions of other pins of the driver chip, reference may be made to related contents in the prior art, which will not be repeated here.

Figure 3:
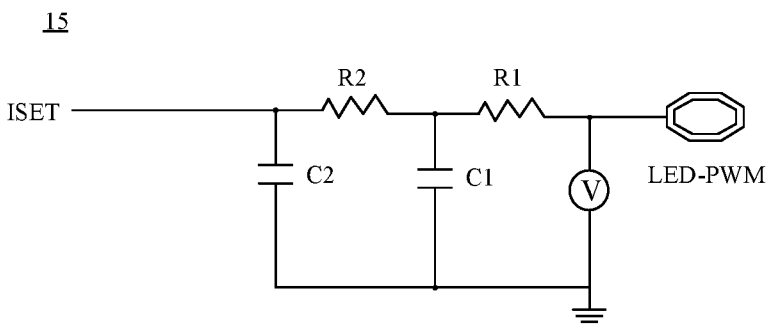
FIG. 3 is a circuit diagram of an integrating circuit, in accordance with some embodiments.

FIG. 3 is a circuit diagram of an integrating circuit 15 according to some embodiments. The integrating circuit 15 may be applied in a situation where the ISET pin is in the voltage detection mode. That is, when the first pulse signal is input to the integrating circuit 15 shown in FIG. 3, the integrating circuit 15 outputs a voltage.

For example, as shown in FIG. 3, the integrating circuit 15 includes a first resistor R1, a second resistor R2, a first capacitor C1 and a second capacitor C2. One terminal of the first resistor R1 is coupled to a LED-PWM pulse signal terminal (i.e., a terminal for receiving the first pulse signal), and the other terminal of the first resistor R1 is coupled to one terminal of the second resistor R2 and one terminal of the first capacitor C1. The other terminal of the first capacitor C1 is grounded. The other terminal of the second resistor R2 is coupled to the ISET pin and one terminal of the second capacitor C2. The other terminal of the second capacitor C2 is grounded.

In a case where the ISET pin of the driver chip is in the voltage detection mode, the driver chip has a large internal resistance. In this case, the LED-PWM pulse signal is input to the integrating circuit 15 shown in FIG. 3 in a form of voltage. After the LED-PWM pulse signal is input to the integrating circuit 15 shown in FIG. 3, a voltage on the ISET pin may be determined according to the voltage of the LED-PWM pulse signal. According to the voltage on the ISET pin, the driver chip may output a drive current corresponding to the voltage of the ISET pin. That is, the driver chip may output a drive current according to the first pulse signal.

Figure 4:
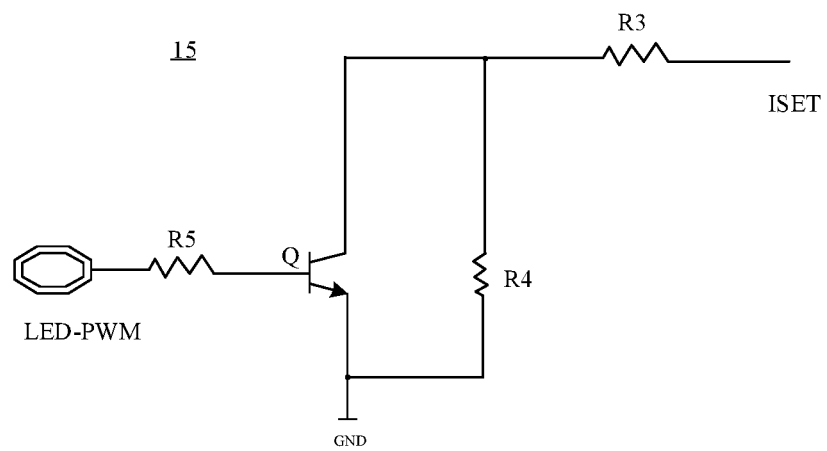
FIG. 4 is a circuit diagram of another integrating circuit, in accordance with some embodiments.

FIG. 4 is a circuit diagram of another integrating circuit 15 according to some embodiments. The integrating circuit 15 may be used in a situation where the ISET pin is in the current detection mode. That is, when the LED-PWM pulse signal is input to the integrating circuit 15 shown in FIG. 4, the integrating circuit 15 outputs a current.

As shown in FIG. 4, the integrating circuit 15 includes a third resistor R3, a fourth resistor R4, a fifth resistor R5 and a transistor Q. One terminal of the third resistor R3 is coupled to the ISET pin, and the other terminal of the third resistor R3 is coupled to one terminal of the fourth resistor R4 and a collector of the transistor Q. The other terminal of the fourth resistor R4 is grounded. An emitter of the transistor Q is grounded, and a base of the transistor Q is coupled to one terminal of the fifth resistor R5. The other terminal of the fifth resistor R5 is coupled to the LED-PWM pulse signal terminal.

After the LED-PWM pulse signal is input to the integrating circuit 15 shown in FIG. 4, the transistor Q may be controlled by the LED-PWM pulse signal to operate in a cut-off region, a triode region or a saturation region. When the transistor Q operates in the cut-off region, the triode region or the saturation region, an equivalent resistance of the transistor Q is different, so that the current input to the ISET pin will change according to the equivalent resistance of the transistor Q. According to the current at the ISET pin, the driver chip may output a drive current, so that the driver chip outputs the drive current according to the first pulse signal.

In some examples, as shown in FIG. 1, the brightness control system 1 further includes an image acquisition device 13, such as a camera. The image acquisition device 13 is configured to capture an image at the ambient light, and send the image to the control device 10. The control device 10 is further configured to analyze a clarity of the captured image and determine whether to obtain the brightness of the ambient light according to the clarity of the captured image. When and how to obtain the brightness of the ambient light will be described later.

In addition, the control device 10 may be a computer device, such as a terminal device or a server. The terminal device may be a palmtop computer, a notebook computer, a smart phone, a tablet computer, a desktop computer or a vehicle terminal, such as a transmission control unit. The server may be a single server, a server cluster composed of multiple servers, or a cloud computing service center. The integrating circuit 15 and the driver device 11 may also be integrated in the control device 10.

Figure 5:
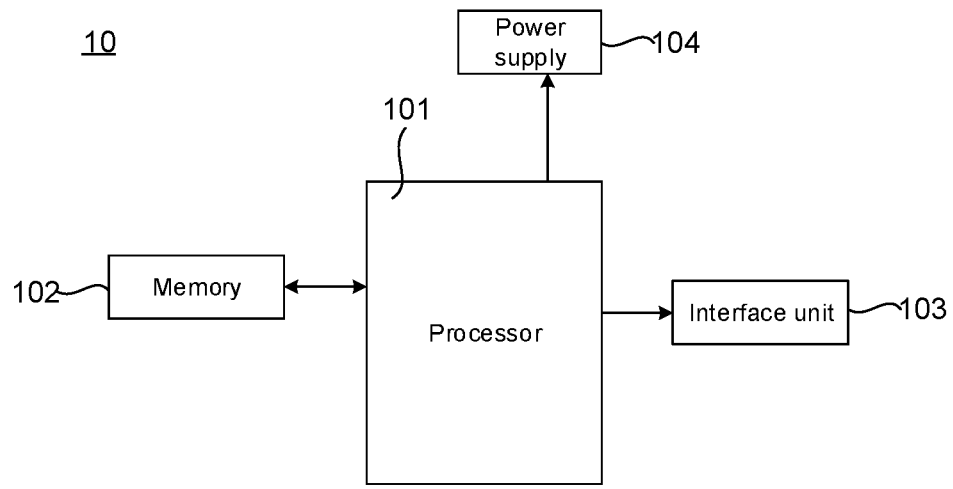
FIG. 5 is a block diagram of a control device, in accordance with some embodiments.

FIG. 5 is a block diagram of a hardware structure of a control device according to some embodiments. The control device 10 may include a processor 101, a memory 102, an interface unit 103 and a power supply 104. However, the control device 10 may include more or fewer components than that shown in FIG. 5 according to actual needs.

The processor 101 is a control center of the control device 10, and is connected to various parts of the entire control device 10 through various interfaces and lines. The processor 101 is configured to perform various functions of the control device 10 and process data by running or executing software programs and/or modules stored in the memory 102, and calling data stored in the memory 102, so as to perform an overall monitoring function of the control device 10.

The processor 101 may include one or more processing units. For example, the processor 101 may be integrated with an application processor and a modem processor. The application processor mainly processes the operating system, the user interface, the application programs, etc., and the modem processor mainly processes the wireless communication. It will be understood that the modem processor may also not be integrated in the processor 101.

The memory 102 may be configured to store software programs and various data. In this case, the memory 102 may include a program storage area and a data storage area. The program storage area may store at least one operating system, at least one application program required by at least one function unit, and the like.

The memory 102 may include a high-speed random access memory, and may also include a non-volatile memory, such as at least one magnetic disk storage device, a flash memory device, or other non-volatile solid state storage devices. For example, the memory 102 may be a non-transitory computer readable storage medium. For example, the non-transitory computer readable storage medium may be a read-only memory (ROM), a random access memory (RAM), a CD-ROM, a magnetic tape, a floppy disk, or an optical data storage device.

The interface unit 103 is an interface for connecting an external device to the control device 10. For example, the external device includes an external power supply (or a battery charger) port, a wired data port, a wireless data port, and a memory card port. The wired data port may be, for example, a universal serial bus (USB) interface or a network cable interface. The wireless data port may be, for example, a Wi-Fi interface, a Bluetooth interface, or a near field communication (NFC) interface. The interface unit 103 may be used to receive input information (e.g., data information) from the external device and transmit the received input information to one or more components of the control device 10, or the interface unit 103 may be used to transfer data between the control device 10 and the external device.

The power supply 104 (e.g., a battery) may be configured to supply power to various components. The power supply 104 may be logically connected to the processor 101 through a power management system, so as to implement functions such as charging management, discharging management, and power consumption management through the power management system.

Figure 6:
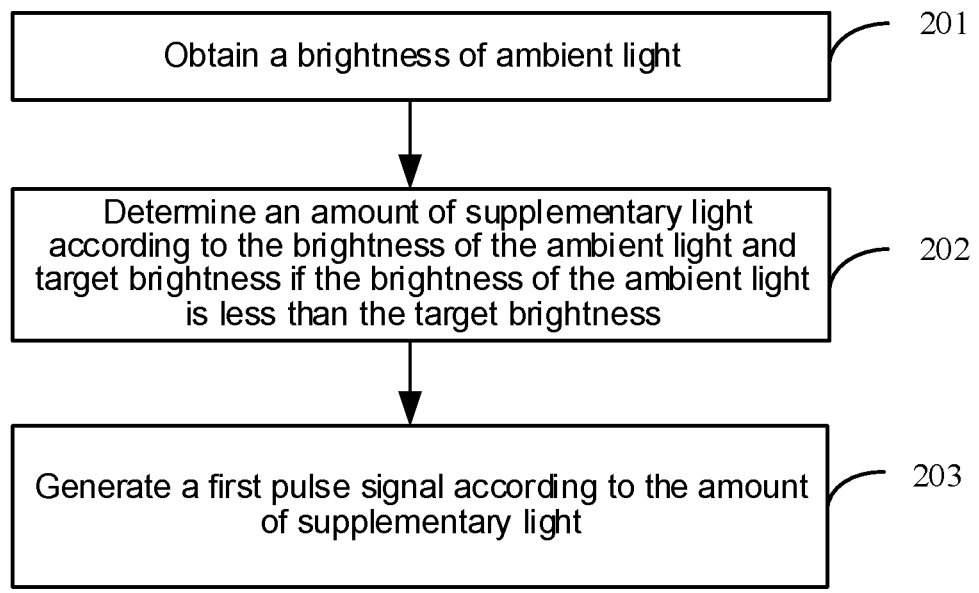
FIG. 6 is a flow diagram of a brightness control method of an illumination device, in accordance with some embodiments.

Some embodiments of the present disclosure provide a brightness control method of an illumination device. The brightness control method may be performed by the control device 10 of the brightness control system 1 shown in FIG. 1. As shown in FIG. 6, the brightness control method includes steps 201 to 203.

In step 201, the control device 10 obtains a brightness of the ambient light.

After detecting the brightness of the ambient light, the ambient light detection device 12 sends the brightness of the ambient light to the control device 10, so that the control device 10 obtains the brightness of the ambient light.

In some examples, the ambient light detection device 12 detects the brightness of the ambient light in real time, and the control device 10 receives the brightness of the ambient light in real time. That is, regardless of day or night, the control device 10 will receive the brightness of the ambient light sent by the ambient light detection device 12.

In some other examples, the ambient light detection device 12 detects the brightness of the ambient light in real time, but the control device 10 receives the brightness of the ambient light within a preset time period. The preset time period may be, for example, 18:00-6:00 (24-hour clock) per day. That is, the control device 10 only receives the brightness of the ambient light when the brightness of the ambient light is low. Of course, the ambient light detection device 12 may also only detect the brightness of the ambient light within the preset time period.

In yet some other examples, the ambient light detection device 12 detects the brightness of the ambient light in real time. The control device 10 obtains a clarity of an image captured under the ambient light. If the clarity of the image is less than a preset clarity, the control device 10 obtains the brightness of the ambient light.

For example, the ambient light detection device 12 detects the brightness of the ambient light in real time. The image acquisition device 13 captures an image under the brightness of the ambient light, and sends the image to the control device 10. The control device 10 processes the image to determine the clarity of the image. If the clarity of the image is less than the preset clarity, the control device 10 obtains (e.g., receives) the brightness of the ambient light.

For another example, the ambient light detection device 12 detects the brightness of the ambient light in real time. The image acquisition device 13 captures an image under the brightness of the ambient light, processes the captured image to determine the clarity of the image and generates first prompt information for indicating the clarity of the image. Then, the image acquisition device 13 sends the first prompt information to the control device 10, and the control device 10 determines the clarity of the image according to the first prompt information. If the clarity of the image is less than the preset clarity, the control device 10 obtains the brightness of the ambient light. The method of determining the clarity of the image is not limited, which may use the existing technology.

In step 202, if the brightness of the ambient light is less than a target brightness, the control device 10 determines an amount of supplementary light according to the brightness of the ambient light and the target brightness.

It will be noted that the target brightness is a preset brightness. In the embodiments of the present disclosure, the picture of the image captured by the image acquisition device 13 under the target brightness is clear and bright.

For example, the target brightness is 30 cd/m$^2$. If the brightness of the ambient light is 20 cd/m$^2$, the amount of supplementary light is 10 cd/m$^2$ (that is, the amount of supplementary light is a difference between the target brightness and the brightness of the ambient light). That is, the brightness of light emitted by the illumination device 14 is 10 cd/m$^2$, so that a total brightness of the brightness of the ambient light and the brightness of the light emitted by the illumination device 14 may reach the target brightness. As a result, the picture of the image captured by the image acquisition device 13 may be clear and bright.

In step 203, the control device 10 generates a first pulse signal according to the amount of supplementary light, so as to control the illumination device 14 to emit light.

Figure 7:
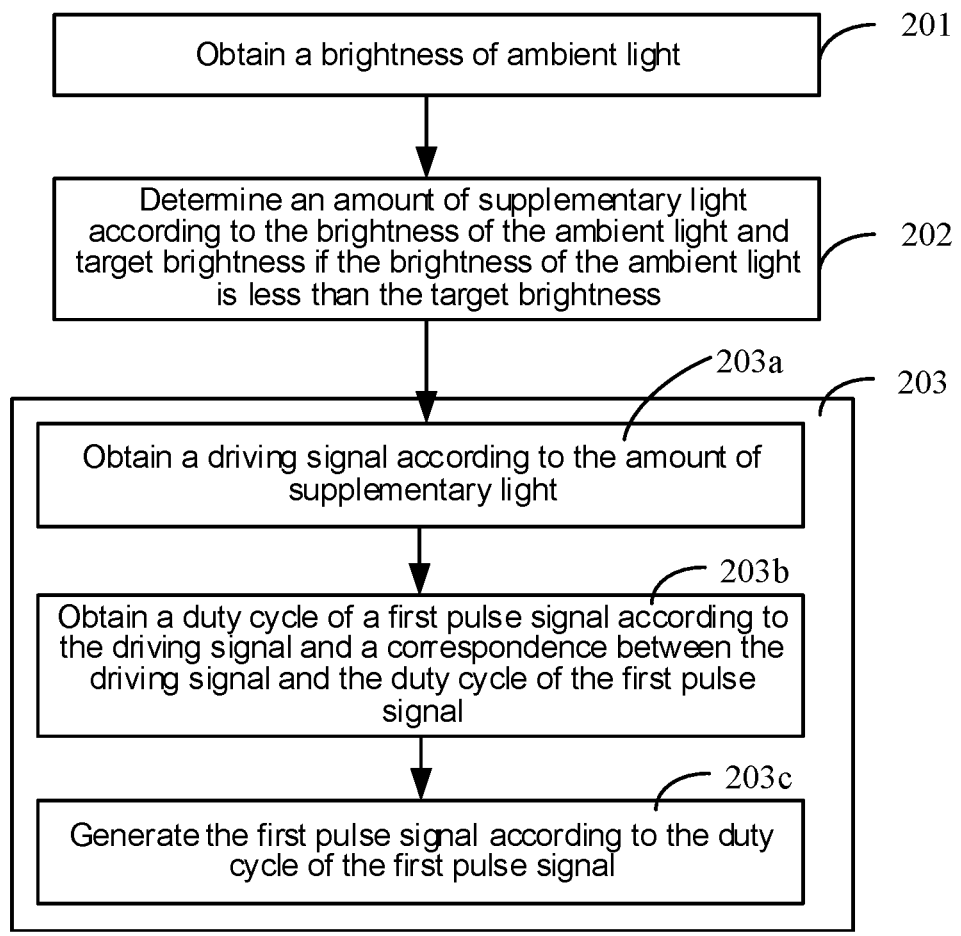
FIG. 7 is a flow diagram of another brightness control method of an illumination device, in accordance with some embodiments.

In some examples, as shown in FIG. 7, step 203 includes steps 203a to 203c.

In step 203a, the control device 10 obtains a driving signal according to the amount of supplementary light.

For example, the control device 10 obtains, according to the following formula, a power converted into light (i.e., an output optical power corresponding to light intensity) of the illumination device 14 in an output power of the illumination device 14 when the illumination device 14 is driven to emit light with the amount of supplementary light:

$$POY_n = \frac{(POY_2 - POY_1)}{(W_2 - W_1) \cdot W_n}.$$

Where POY is a power converted into light in an output power of the illumination device 14; $POY_2$ is a power converted into light in an output power of the illumination device 14 when the illumination device 14 is driven to emit light with the maximum brightness; $POY_1$ is a power converted into light in another output power of the illumination device 14 when the illumination device 14 is driven to emit light with the minimum brightness; $POY_n$ a power converted into light in yet another output power of the illumination device 14 when the illumination device 14 is driven to emit light with the amount of supplementary light; n represents a driving signal corresponding to the amount of supplementary light; $W_2$ is the maximum brightness of the illumination device 14, $W_1$ is the minimum brightness of the illumination device 14, and $W_n$ is the amount of supplementary light. It will be noted that the output power of the illumination device may be changed as the brightness of the light emitted by the illumination device is changed.

Figure 8:
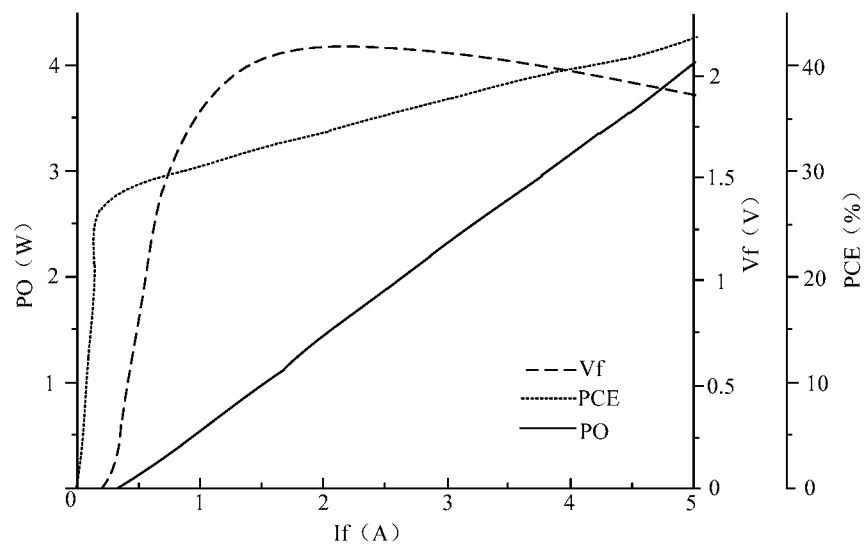
FIG. 8 is a graph illustrating an output power of an illumination device and a photoelectric conversion efficiency of the illumination device versus a drive current and a drive voltage of the illumination device, in accordance with some embodiments.

FIG. 8 is a graph illustrating an output power PO of an illumination device, and a photoelectric conversion efficiency PCE of the illumination device versus a drive current and voltage of the illumination device, according to some embodiments. It will be noted that each light-emitting brightness of the illumination device 14 corresponds to a respective brightness value of an object to be captured.

The power POY converted into light in the output power of the illumination device 14 satisfies the following formula: POY=PO×PCE, where PO is the output power of the illumination device 14, and PCE is a photoelectric conversion efficiency of the illumination device 14.

Combined with FIG. 8 and the formula POY=PO×PCE, a correspondence between the power converted into light in the output power of the illumination device 14 and the drive current of the illumination device may be determined.

It will be noted that before the brightness control system 1 is used, the brightness control system 1 may be debugged according to the actual situation. For example, the brightness control system 1 is debugged according to information such as a model of a vehicle actually used, a camera, an installation position of the illumination device 14 and a distance from the object to be captured, so that the brightness control system 1 may be reliably used.

For example, the debugging content includes determining a maximum operating current of the illumination device 14 under a condition of a completely dark room (e.g., a completely dark environment), according to a maximum brightness of the illumination device 14, so as to set the maximum operating current of the illumination device 14 as a maximum current value output by the driver device 11 in subsequent use. That is, in subsequent use, the maximum current output by the driver device 11 cannot exceed the maximum operating current of the illumination device 14.

In addition, when the maximum current value output by the driver device 11 is set, the aging of the illumination device 14 and a redundancy of a current value after the efficiency is reduced may also be considered.

For example, the debugging content further includes determining a minimum operating current of the illumination device 14 under a fully bright condition (e.g., under strong sunlight at noon), according to a minimum brightness of the illumination device 14. In subsequent use, the minimum current output by the driver device 11 is not less than the minimum operating current of the illumination device 14.

For example, in the natural environment where supplementary light is not required, the operating current of the illumination device 14 is 0 A (that is, the illumination device 14 is in an OFF state), and the required amount of supplementary light $W_1$ is zero. When the ambient light is at its darkest (which corresponds to a completely dark environment), the operating current of the illumination device 14 is 3.5 A (in this case, the light emitted by the illumination device 14 has the maximum brightness), and the required amount of supplementary light $W_2$ is 55 cd/m$^2$.

After the power converted into light in the output power of the illumination device 14 is obtained when the illumination device 14 is driven to emit light with the amount of supplementary light, the control device 10 may obtain the driving signal according to the power converted into light in the output power of the illumination device 14 and a correspondence between the power converted into light in the output power of the illumination device 14 and the driving signal (e.g., a drive current) of the illumination device 14.

As shown in Table 1 below, Table 1 shows the correspondence between the power POY converted into light in the output power of the illumination device 14 and the driving signal of the illumination device 14.

TABLE 1

| I (A) | 0 | 0.5 | 1 | 1.5 | 2 | 2.5 | 3 |
|---|---|---|---|---|---|---|---|
| PO (W) | 0 | 0.2 | 0.56 | 1 | 1.5 | 1.85 | 2.35 |
| PCE | 0 | 20% | 36% | 40% | 43% | 43% | 41% |
| POY (W) | 0 | 0.04 | 0.2016 | 0.4 | 0.6375 | 0.78625 | 0.9635 |
| Wn (cd/m$^2$) | 0 | 2 | 10.08 | 20 | 31.875 | 39.3125 | 48.175 |

On the basis of the above formula, when the illumination device 14 is driven to emit light with the amount of supplementary light, the power POY$_n$ converted into light in the output power of the illumination device 14 may be obtained, and then the power POY$_n$ is compared with data in Table 1 to determine a driving signal (e.g., a drive current I).

It will be noted that Table 1 is illustrated by considering an example where the driving signal is a drive current.

In step 203b, the control device 10 obtains a duty cycle of the first pulse signal according to the driving signal and a correspondence between the driving signal and the duty cycle of the first pulse signal.

The correspondence between the duty cycle of the first pulse signal and the driving signal is preset. For example, the correspondence between the duty cycle of the first pulse signal and the driving signal may be pre-stored in the control device 10.

As shown in FIG. 2, an ENA pin and a VIN pin of the driver chip are electrically connected to a power supply VDD, and the power supply VDD is configured to supply power to the VIN pin and provide an enable signal to the ENA pin, that is, to supply power and provide the enable signal to the driver device 11, so that the driver device 11 operates normally.

Figure 9:
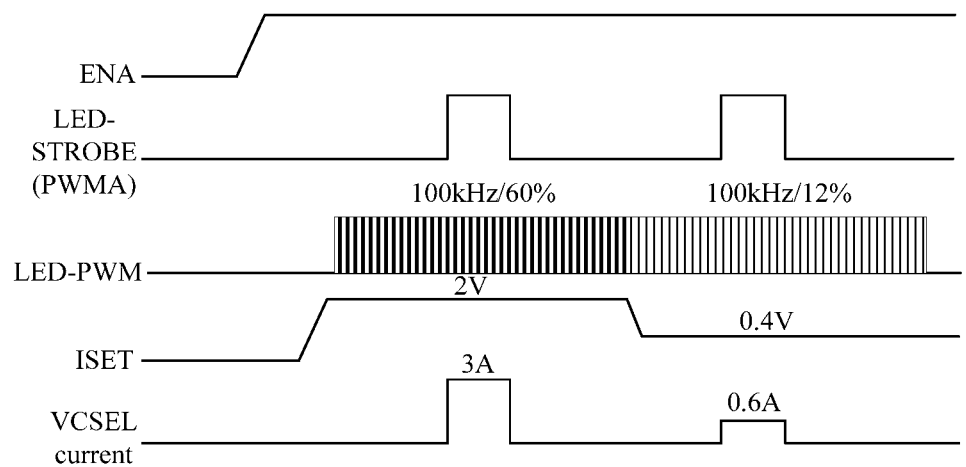
FIG. 9 is a diagram illustrating simulation results, in accordance with some embodiments.

As shown in FIG. 9, the LED-PWM represents a first pulse signal (e.g., an LED-PWM pulse signal) input by the control device 10 to the integrating circuit 15. For example, an operating frequency of the LED-PWM pulse signal is 100 kHz, and the duty cycle thereof is 60%, or the duty cycle thereof is 12%.

The ISET represents the voltage on the ISET pin of the driver device 11. For example, in a case where the operating frequency of the LED-PWM signal is 100 kHz and the duty cycle thereof is 60%, the voltage on the ISET pin is 2V. For another example, in a case where the operating frequency of the LED-PWM pulse signal is 100 kHz and the duty cycle thereof is 12%, the voltage on the ISET pin is 0.4 V.

The VCSEL current represents a drive current output by the driver device 11. For example, in the case where the operating frequency of the LED-PWM pulse signal is 100 kHz and the duty cycle thereof is 60%, the drive current output by the driver device 11 is 3 A. For another example, in the case where the operating frequency of the LED-PWM pulse signal is 100 kHz and the duty cycle thereof is 12%, the drive current output by the driver device 11 is 0.6 A.

It can be seen from FIG. 9 that as the duty cycle of the LED-PWM pulse signal is different, a voltage value on the ISET pin of the driver device 11 is also different, so that the drive current output by the driver device 11 is also different. For example, when the duty cycle of the LED-PWM pulse signal is 60%, the voltage value on the ISET pin of the driver device 11 is 2 V, and correspondingly, the drive current output by the driver device 11 is 3 A. For another example, when the duty cycle of the LED-PWM pulse signal is 12%, the voltage value on the ISET pin of the driver device 11 is 0.4 V, and correspondingly, the drive current output by the driver device 11 is 0.6 A.

That is, assuming that the driving signal is 3 A, referring to FIG. 9, it can be seen that the duty cycle of the first pulse signal is 60%. In this way, after the driving signal is obtained, the duty cycle of the first pulse signal may be obtained according to the correspondence between the driving signal and the duty cycle of the first pulse signal.

In step 203c, the control device 10 generates the first pulse signal according to the duty cycle of the first pulse signal.

After obtaining the duty cycle of the first pulse signal, the control device 10 may generate the first pulse signal according to the duty cycle.

Figure 10:
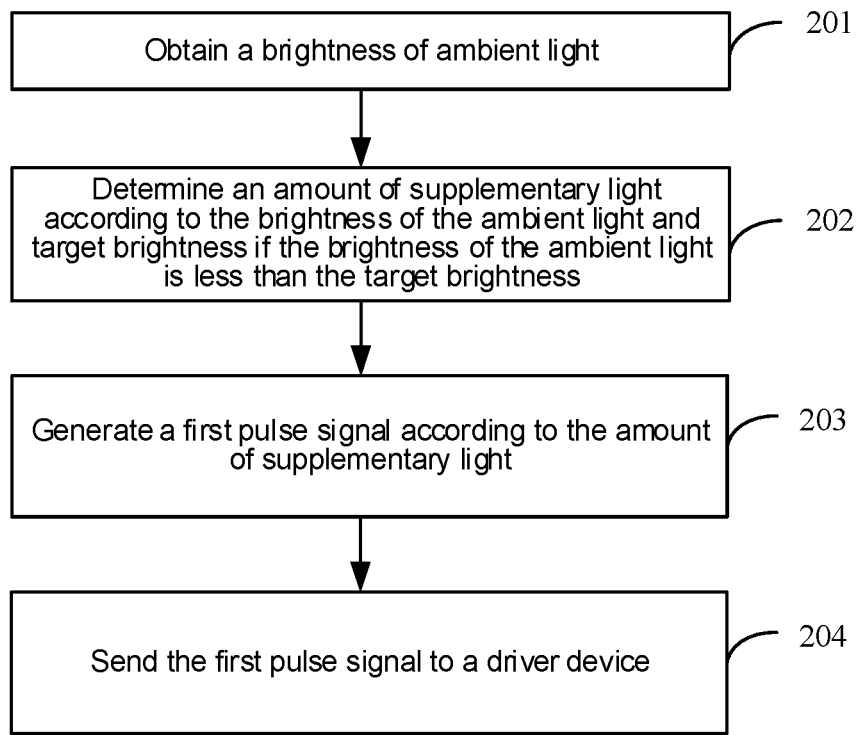
FIG. 10 is a flow diagram of yet another brightness control method of an illumination device, in accordance with some embodiments.

In some examples, as shown in FIG. 10, the brightness control method further includes step 204 after step 203 is performed.

In step 204, the control device 10 sends the first pulse signal to the driver device 11, so that the driver device 11 controls, according to the first pulse signal, the illumination device 14 to emit light.

For example, with reference to FIG. 1 and the above embodiments, the control device 10 may generate a first pulse signal according to the amount of supplementary light, and send the first pulse signal to the ISET pin of the driver device 11. After receiving the first pulse signal through the ISET pin, the driver device 11 outputs a drive current to the illumination device 14 to drive the illumination device 14 to emit light.

As described above, the control device 10 generates the first pulse signal according to the amount of supplementary light, and sends the first pulse signal to the ISET pin of the driver device 11. The driver device 11 may output the drive current to the illumination device 14 according to the first pulse signal, so that the illumination device 14 emit lights as driven by the drive current. In this way, the brightness of the ambient light may be adjusted.

In some embodiments, step 204 may include: sending, by the control device 10, the first pulse signal to the integrating circuit 15, so that the driver device 11 outputs a drive current to the illumination device 14 according to the first pulse signal.

In this case, the control device 10 sends a first pulse signal to the integrating circuit 15, and the integrating circuit 15 may adjust, according to the first pulse signal, the drive current that is to be output by the driver device 11.

For example, as shown in FIG. 2, an input terminal (i.e., an LED-PWM pulse signal terminal) of the integrating circuit 15 is connected to the control device 10, and the output terminal of the integrating circuit 15 is connected to the ISET pin of the driver device 11. When the control device 10 generates a different first pulse signal (e.g., an LED-PWM pulse signal), and sends the LED-PWM pulse signal to the input terminal of the integrating circuit 15, the integrating circuit 15 may adjust the voltage on the ISET pin of the driver device 11, so that the drive current output by the driver device 11, i.e., the drive current output to the illumination device 14 is changed.

As described above, the first pulse signal may be a current or a voltage. For example, the first pulse signal is a voltage, and the integrating circuit 15 shown in FIG. 3 may be adopted. For another example, the first pulse signal is a current, and the integrating circuit 15 shown in FIG. 4 may be adopted.

With reference to the above embodiments, the control device 10 inputs an LED-PWM signal (i.e., a first pulse signal) with a duty cycle of 60% to the integrating circuit 15, and the voltage output by the integrating circuit 15 is 2 V, that is, the voltage on the ISET pin of the driver device 11 is 2 V, so that the drive current output by the driver device 11 is 3 A. That is, when the drive current output by the driver device 11 is 3 A, the drive current may drive the illumination device 14 to emit light according to the amount of supplementary light.

It will be noted that since parameters of components of the integrating circuit 15 have certain errors, in actual implementation, there may be certain errors in the voltage output by the integrating circuit 15, which is a normal situation. Therefore, the output current of the illumination device 14 finally obtained according to the brightness control method is subject to the actual situation.

Figure 11:
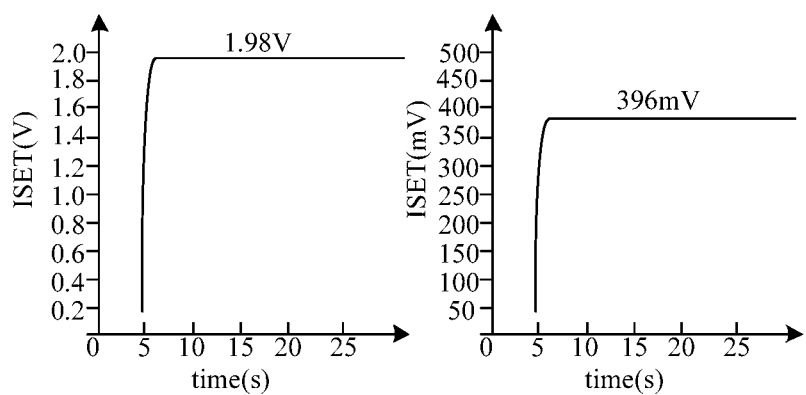
FIG. 11 is a graph illustrating a voltage at an ISET pin versus time in a practical implementation, in accordance with some embodiments.

For example, in actual implementation, as shown in FIG. 11, after the control device 10 inputs a first pulse signal with an operating frequency of 100 kHz and a duty cycle of 60% to the integrating circuit 15, an output voltage of the integrating circuit 15 is 1.98 V. That is, the voltage on the ISET pin of the driver device 11 is 1.98 V. After the control device 10 inputs a pulse signal with an operating frequency of 100 kHz and a duty cycle of 12% to the integrating circuit 15, the output voltage of the integrating circuit 15 is 396 mV. That is, the voltage on the ISET pin of the driver device 11 is 396 mV.

Figure 12:
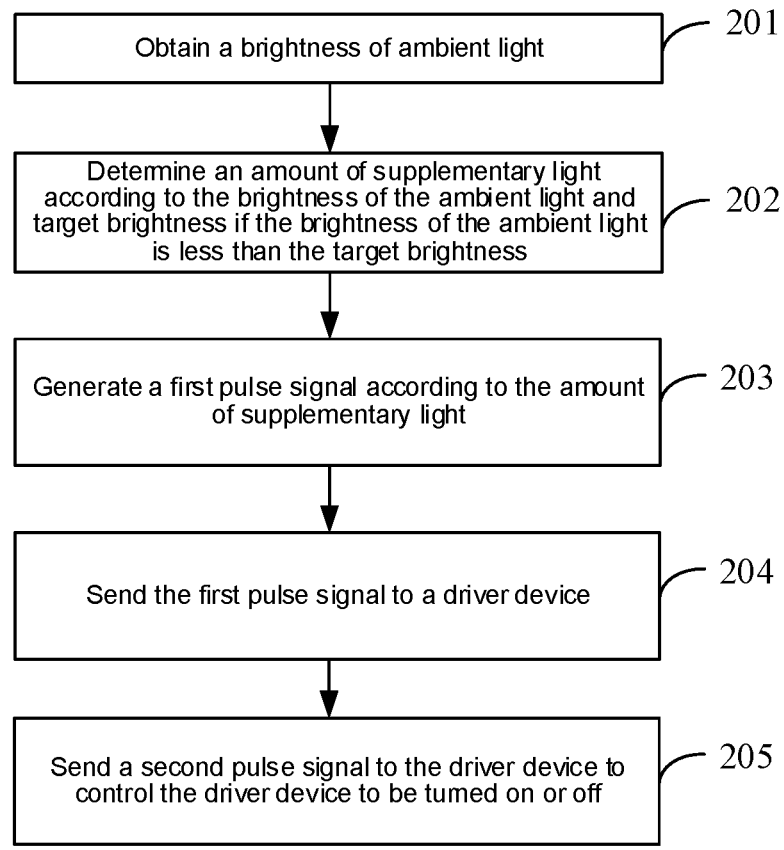
FIG. 12 is a flow diagram of yet another brightness control method of an illumination device, in accordance with some embodiments.

In some examples, in a case where the driver device 11 is turned on as driven by a high-level or low-level signal, as shown in FIG. 12, the brightness control method further includes step 205.

In step 205, the control device 10 sends a second pulse signal to the driver device 11 to control the driver device 11 to be turned on or off.

In this case, the control device 10 sends a second pulse signal (e.g., an LED-STROBE pulse signal) to the driver device 11 to trigger the operating state of the driver device 11. When the driver device 11 receives the second pulse signal sent by the control device 10, the operating state of the driver device 11 is an ON state or an OFF state.

For example, a port of the control device 10 through which the control device 10 outputs the second pulse signal is an I/O port. The control device 10 may control the driver device 11 to be turned on when the output second pulse signal is at a high level, thereby controlling the illumination device 14 to emit light. Alternatively, the control device 10 may control the driver device 11 to be turned on when the output second pulse signal is at a low level, thereby controlling the illumination device 14 to emit light, which is not limited in the embodiments of the present disclosure.

The following description will be made by considering an example where the driver device 11 is turned on when the second pulse signal output by the control device 10 is at a high level, and the driver device 11 is turned off when the second pulse signal output by the control device 10 is at a low level.

For example, the control device 10 sends the second pulse signal at the high level to the driver device 11. The driver device 11 is turned on in response to the second pulse signal, and outputs a drive current to the illumination device 14 to control the illumination device 14 to emit light. For another example, the control device 10 sends the second pulse signal at the low level to the driver device 11. The driver device 11 is turned off in response to the second pulse signal, and thus the illumination device does not emit light.

As shown in FIG. 9, LED-STROBE (PWMA) represents the LED-STROBE pulse signal (i.e., the second pulse signal) input by the control device 10 to the PWMA pin of the driver device 11. For example, when the LED-STROBE pulse signal is at a high level, the driver device 11 is controlled by the LED-STROBE pulse signal to be turned on.

For example, with reference to FIG. 2 and the above embodiments, the control device 10 sends the LED-STROBE pulse signal (i.e., the second pulse signal) to the PWMA pin of the driver device 11 to control the driver device 11 to be turned on. After the driver device 11 is turned on, the control device 10 sends the first pulse signal to the ISET pin of the driver device 11 to adjust the drive current that is to be output by the driver device 11, so that the illumination device 14 emits light as driven by the adjusted drive current.

It will be noted that, the control device 10 may output the first pulse signal according to the amount of supplementary light first to the ISET pin of the driver device 11, and then output the second pulse signal to the PWMA pin of the driver device 11 to control the driver device 11 to be turned on, so that the illumination device 14 emits light with the amount of supplementary light. In this case, a duration of the ISET pin of the driver device 11 in an ON state may be set to be greater than a duration of the PWMA pin of the driver device 11 in an ON state.

In this way, the voltage on the ISET pin may be stable when the driver device 11 is normally turned on, and thus every time the driver device 11 is in the ON state, the voltage signal on the ISET pin may be a voltage signal required by the driver device 11 to operate, which makes the driver device 11 output a drive current. As a result, the illumination device 14 emits light, and the brightness of the illumination device 14 is equal to the amount of the supplementary light.

Figure 13:
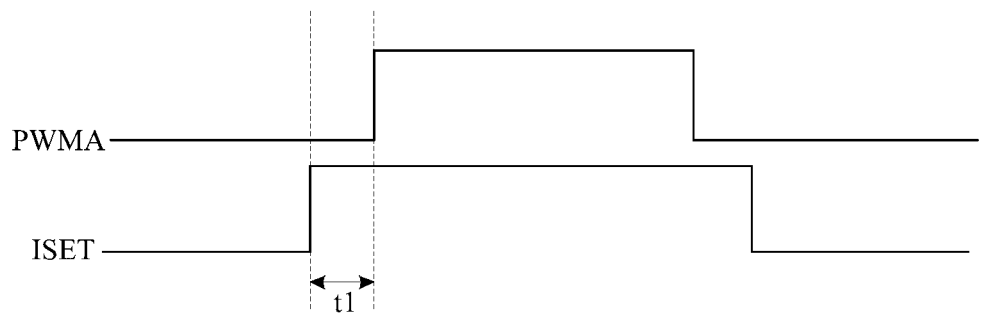
FIG. 13 is a timing diagram of signals through an ISET pin and a PWMA pin, in accordance with some embodiments.

FIG. 13 is a timing diagram of signals through the PWMA pin and the ISET pin according to some embodiments. As shown in FIG. 13, the duration of the ISET pulse signal through the ISET pin in an ON state is greater than the duration of the PWMA pulse signal through the PWMA pin in an ON state. For example, the PWMA pin will not be turned on until the ISET pin is turned on for t1.

In order to achieve that the duration of the ISET pulse signal through the ISET pin in ON state is greater than the duration of the PWMA pulse signal through the PWMA pin in ON state, an operating frequency of the ISET pin may be set to be greater than that of the PWMA pin. For example, the operating frequency of the ISET pin is 100 kHz, and the operating frequency of the PWMA pin is 60 Hz.

In the brightness control method provided by the embodiments, the control device 10 compares the brightness of the ambient light with the target brightness, determines the brightness of the supplementary light, i.e., the amount of supplementary light, and generates the first pulse signal according to the amount of supplementary light. Then, the control device 10 controls the illumination device 14 to emit light according to the first pulse signal. Since the first pulse signal is used to control the brightness of the illumination device 14 and the first pulse signal corresponds to the amount of supplementary light, when the illumination device 14 emits light according to the first pulse signal, the brightness of the light emitted by the illumination device 14 is the same as the amount of supplementary light, so that the brightness of the light emitted by the illumination device may be adjusted in real time according to the brightness of the ambient light.

The above contents mainly describe the solutions provided by the embodiments of the present disclosure from the perspective of interaction among the control device 10, the driver device 11, the ambient light detection device 12 and the illumination device 14 in the brightness control system 1 of the illumination device 14. It will be understood that in order to implement the above functions, the control device 10, the driver device 11, the ambient light detection device 12, the illumination device 14, and the like include respective hardware structures and/or software modules for executing the functions. Those skilled in the art will easily realize that the embodiments may be implemented in hardware or a combination of hardware and computer software in conjunction with the units and algorithm steps of each example described in the embodiments disclosed herein. Whether a function is performed by hardware or computer software driving hardware depends on the specific application and design constraints of the technical solution. Those skilled may use different methods to implement the described functions for each specific application, but such implementations should not be considered as exceeding the protection scope of the present disclosure.

Some embodiments of the present disclosure provide a brightness control device of an illumination device. The brightness control device includes a memory and one or more processor coupled to the memory. The memory is configured to store computer program codes including computer program instructions. At least one processor is configured to when executing the computer program instructions, perform: obtaining a brightness of ambient light, determining an amount of supplementary light according to the brightness of the ambient light and a target brightness if the brightness of the ambient light is less than the target brightness, and generating a first pulse signal according to the amount of supplementary light to control the illumination device to emit light.

In some embodiments, the at least one processor is further configured to perform: sending the first pulse signal to a driver device, so that the driver device controls, according to the first pulse signal, the illumination device to emit light.

In some embodiments, the at least one processor is further configured to perform: sending a second pulse signal to the driver device to control the driver device to be turned on or off.

In some embodiments, the at least one processor is configured to perform: sending the first pulse signal to an integrating circuit, so that the integrating circuit outputs a current or a voltage to the driver device to drive the driver device to output a drive current to the illumination device.

In some embodiments, the at least one processor is configured to perform: obtaining a driving signal according to the amount of supplementary light, obtaining a duty cycle of the first pulse signal according to the driving signal and a correspondence between the driving signal and the duty cycle of the first pulse signal, and generating the first pulse signal according to the duty cycle of the first pulse signal.

In some embodiments, the at least one processor is configured to perform: obtaining, according to a following formula, a power converted into light in an output power of the illumination device when the illumination device is driven to emit light with the amount of supplementary light:

$$POY_n = \frac{(POY_2 - POY_1)}{(W_2 - W_1) \cdot W_n};$$

where $POY_2$ is a power, converted into light with a maximum brightness, in an output power of the illumination device when the illumination device is driven to emit the light with the maximum brightness, $POY_1$ is a power, converted into light with a minimum brightness, in another output power of the illumination device when the illumination device is driven to emit the light with the minimum brightness, $POY_n$ is a power, converted into light with the amount of supplementary light, in yet another output power of the illumination device when the illumination device is driven to emit the light with the amount of supplementary light, n represents the driving signal corresponding to the amount of supplementary light; $W_2$ is the maximum brightness, $W_1$ is the minimum brightness, and $W_n$ is the amount of supplementary light; and obtaining the driving signal according to the power converted into the light with the amount of supplementary light, and a correspondence between the driving signal and the power converted into the light with the amount of supplementary light.

Some embodiments of the present disclosure provide a non-transitory computer-readable storage medium. The computer readable storage medium stores therein computer programs that, when run on a computer (e.g., a brightness control device of the illumination device), cause the brightness control device of the illumination device to perform the brightness control method described in any of the above embodiments.

For example, the computer-readable storage medium may include, but is not limited to: a magnetic storage device (e.g. a hard disk, a floppy disk, or a magnetic tape, etc.), an optical disk (e.g. a compact disk (CD), a digital versatile disk (DVD), etc.), a smart card or a flash memory device (e.g. an erasable programmable read-only memory (EPROM), a card, a stick or a key drive, etc.). The various computer-readable storage media may represent one or more devices and/or other machine-readable storage media for storing information. The term "machine-readable storage media" may include, but are not limited to, wireless channels and various other media capable of storing, containing, and/or carrying instructions and/or data.

Some embodiments of the present disclosure provide a computer program product including computer programs carried on a non-transitory computer-readable storage medium. When run on a computer (e.g., a brightness control device of the illumination device), the computer program product causes the brightness control device of the illumination device to perform the brightness control method described in any of the above embodiments.

The non-transitory computer-readable storage medium and the computer program product have the same beneficial effects as the brightness control methods as described in some embodiments of the present disclosure, which will be not described herein again.

From the above description of the embodiments, those skilled in the art may clearly understand that for convenience and brevity of description, only the above functional module division is used as an example for illustration. In practical applications, the above functions may be assigned to different functional modules as needed. That is, the internal structure of the device is divided into different functional modules to implement all or part of the functions described above.

In several embodiments provided in the present disclosure, it will be understood that the disclosed devices and methods may be implemented through other manners. For example, the device embodiments described above are only illustrative. For example, the modules or unit division is only a logical functional division. In actual implementation, there may be other division manners. For example, multiple units or components may be combined or integrated into another device, or some features may be omitted or not implemented. On the other hand, the mutual coupling or direct coupling or communication connection shown or discussed may be an indirect coupling or communication connection through some interfaces, devices or units, and may be in an electrical, mechanical or other form.

The units described as separate components may or may not be physically separated, and the component(s) shown as units may be one physical unit or multiple physical units, that is, they may be located in one place, or may be distributed to multiple different places. Some or all of the units may be selected according to actual needs to achieve the purposes of the solutions in the embodiments.

In addition, the functional units in the embodiments of the present disclosure may be integrated into one processing unit. The units may exist physically alone, or two or more units may be integrated into one unit. The above integrated units may be implemented in the form of hardware, or may be implemented in the form of software functional units.

If the integrated unit is implemented in the form of the software functional unit and sold or used as an independent product, it may be stored in a readable storage medium. Based on such understanding, the technical solutions of the embodiments of the present disclosure may essentially or a part of the technical solutions contributing to the prior art, or all or part of the technical solutions may be embodied in the form of software products. The software product is stored in a storage medium, and includes several instructions to make a device (which may be a single-chip microcomputer, a chip, etc.) or a processor to perform all or part of the steps of the methods described in the embodiments of the present disclosure.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A brightness control method of an illumination device, the method comprising:
   obtaining a brightness of ambient light;
   if the brightness of the ambient light is less than a target brightness, determining an amount of supplementary light according to the brightness of the ambient light and the target brightness; and
   generating a first pulse signal according to the amount of supplementary light to control the illumination device to emit light; wherein
   generating the first pulse signal according to the amount of supplementary light, includes:
   obtaining a driving signal according to the amount of supplementary light;
      obtaining a duty cycle of the first pulse signal according to the driving signal and a correspondence between the driving signal and the duty cycle of the first pulse signal; and
   generating the first pulse signal according to the duty cycle of the first pulse signal;
   wherein obtaining the driving signal according to the amount of supplementary light, includes:
      obtaining, according to a following formula, a power converted into light in an output power of the illumination device when the illumination device is driven to emit light with the amount of supplementary light:

$$POY_n = \frac{(POY_2 - POY_1)}{(W_2 - W_1) \cdot W_n};$$

wherein $POY_2$ is a power, converted into light with a maximum brightness, in an output power of the illumination device when the illumination device is driven to emit the light with the maximum brightness; $POY_1$ is a power, converted into light with a minimum brightness in another output power of the illumination device when the illumination device is driven to emit the light with the minimum brightness; $POY_n$ is a power, converted into light with the amount of supplementary light, in yet another output power of the illumination device when the illumination device is driven to emit the light with the amount of supplementary light; n represents the driving signal corresponding to the amount of supplementary light; $W_2$ is the maximum brightness of the illumination device; $W_1$ is the minimum brightness of the illumination device; and $W_n$ is the amount of supplementary light; and obtaining the driving signal according to the power converted into the light with the amount of supplementary light, and a correspondence between the driving signal and the power converted into the light with the amount of supplementary light.

2. The method according to claim 1, wherein after generating the first pulse signal according to the amount of supplementary light, the method further comprises:

sending the first pulse signal to a driver device, so that the driver device controls, according to the first pulse signal, the illumination device to emit light.

3. The method according to claim 2, further comprising: sending a second pulse signal to the driver device to control the driver device to be turned on or off.

4. The method according to claim 2, wherein sending the first pulse signal to the driver device, so that the driver device controls, according to the first pulse signal, the illumination device to emit light, includes:

sending the first pulse signal to an integrating circuit, so that the integrating circuit outputs a current or a voltage to the driver device to drive the driver device to output a drive current to the illumination device.

5. A non-transitory computer-readable storage medium storing computer program instructions that, when run on a computer, cause the computer to perform the brightness control method according to claim 1.

6. A computer program product comprising computer program instructions stored in a non-transitory computer-readable storage medium, wherein when run on a computer, the computer program instructions cause the computer to perform the brightness control method according to claim 1.

7. A brightness control device of an illumination device, the bright control device comprising:

a memory configured to store computer program codes including computer program instructions; and one or more processors coupled to the memory, wherein at least one processor is configured to when executing the computer program instructions, perform:

obtaining a brightness of ambient light;

if the brightness of the ambient light is less than a target brightness, determining an amount of supplementary light according to the brightness of the ambient light and the target brightness; and generating a first pulse signal according to the amount of supplementary light to control the illumination device to emit light; wherein the at least one processor is further configured to perform:

obtaining a driving signal according to the amount of supplementary light;

obtaining a duty cycle of the first pulse signal according to the driving signal and a correspondence between the driving signal and the duty cycle of the first pulse signal; and generating the first pulse signal according to the duty cycle of the first pulse signal;

wherein the at least one processor is further configured to perform:

obtaining, according to a following formula, a power converted into light in an output power of the illumination device when the illumination device is driven to emit light with the amount of supplementary light:

$$POY_n = \frac{(POY_2 - POY_1)}{(W_2 - W_1) \cdot W_n};$$

wherein $POY_2$ is a power, converted into light with a maximum brightness, in an output power of the illumination device when the illumination device is driven to emit the light with the maximum brightness; $POY_1$ is a power, converted into light with a minimum brightness in another output power of the illumination device when the illumination device is driven to emit the light with the minimum brightness; $POY_n$ a power, converted into light with the amount of supplementary light, in yet another output power of the illumination device when the illumination device is driven to emit the light with the amount of supplementary light; n represents the driving signal corresponding to the amount of supplementary light; $W_2$ is the maximum brightness of the illumination device; $W_1$ is the minimum brightness of the illumination device; and $W_n$ is the amount of supplementary light; and obtaining the driving signal according to the power converted into the light with the amount of supplementary light, and a correspondence between the driving signal and the power converted into the light with the amount of supplementary light.

8. The brightness control device according to claim 7, wherein the at least one processor is further configured to perform:

sending the first pulse signal to a driver device, so that the driver device controls, according to the first pulse signal, the illumination device to emit light.

9. The brightness control device according to claim 8, wherein the at least one processor is further configured to perform:

sending a second pulse signal to the driver device to control the driver device to be turned on or off.

10. The brightness control device according to claim 8, wherein the at least one processor is further configured to perform:

sending the first pulse signal to an integrating circuit, so that the integrating circuit outputs a current or a voltage to the driver device to drive the driver device to output a drive current to the illumination device.

11. A brightness control system of an illumination device, the brightness control system comprising:

an ambient light detection device configured to detect a brightness of ambient light;

a control device coupled to the ambient light detection device and configured to:
  obtain the brightness of the ambient light from the ambient light detection device;
  if the brightness of the ambient light is less than a target brightness, determine an amount of supplementary light according to the brightness of the ambient light and the target brightness; and
  generate a first pulse signal according to the amount of supplementary light to control the illumination device to emit light; wherein
the control device is configured to:
  obtain a driving signal according to the amount of supplementary light;
  obtain a duty cycle of the first pulse signal according to the driving signal and a correspondence between the driving signal and the duty cycle of the first pulse signal; and
  generates the first pulse signal according to the duty cycle of the first pulse signal;
wherein the control device is further configured to:
  obtain, according to a following formula, a power converted into light in an output power of the illumination device when the illumination device is driven to emit light with the amount of supplementary light:

$$POY_n = \frac{(POY_2 - POY_1)}{(W_2 - W_1) \cdot W_n};$$

wherein $POY_2$ is a power, converted into light with a maximum brightness, in an output power of the illumination device when the illumination device is driven to emit the light with the maximum brightness; $POY_1$ is a power, converted into light with a minimum brightness in another output power of the illumination device when the illumination device is driven to emit the light with the minimum brightness; $POY_n$ a power, converted into light with the amount of supplementary light, in yet another output power of the illumination device when the illumination device is driven to emit the light with the amount of supplementary light; n represents the driving signal corresponding to the amount of supplementary light; $W_2$ is the maximum brightness of the illumination device; $W_1$ is the minimum brightness of the illumination device; and $W_n$ is the amount of supplementary light; and
  obtain the driving signal according to the power converted into the light with the amount of supplementary light, and a correspondence between the driving signal and the power converted into the light with the amount of supplementary light.

12. The brightness control system according to claim 11, further comprising a driver device coupled to the control device, wherein
  the control device is further configured to send the first pulse signal to the driver device; and
  the driver device is configured to control, according to the first pulse signal, the illumination device to emit light.

13. The brightness control system according to claim 12, wherein the control device is further configured to send a second pulse signal to the driver device to control the driver device to be turned on or off.

14. The brightness control system according to claim 12, further comprising an integrating circuit coupled to the driver device and the control device, wherein
  the control device is configured to send the first pulse signal to the integrating circuit;
  the integrating device is configured to output a current or a voltage to the driver device; and
  the driver device is configured to output, as driven by the current or the voltage, a drive current to the illumination device.

* * * * *